United States Patent [19]

Wah

[11] Patent Number: 4,966,187

[45] Date of Patent: Oct. 30, 1990

[54] VALVE BODY CONCERNING THE BATHTUB COLD/HOT WATER VALVE

[76] Inventor: Men-Shun Wah, No. 4, Alley 1, Lane 504, Chung Yang Rd., Nan Kan District, Taipei, Taiwan

[21] Appl. No.: 432,633

[22] Filed: Nov. 7, 1989

[51] Int. Cl.⁵ ............................................. F16K 11/06
[52] U.S. Cl. .............................. 137/454.5; 137/625.31
[58] Field of Search .............. 137/625.31, 454.5, 454.2

[56] References Cited

U.S. PATENT DOCUMENTS

| | | | |
|---|---|---|---|
| 3,620,254 | 11/1971 | Mongerson | 137/625.31 X |
| 3,831,621 | 8/1974 | Anthony et al. | 137/625.31 X |
| 4,651,770 | 3/1987 | Denham | 137/625.31 X |

*Primary Examiner*—Arnold Rosenthal
*Attorney, Agent, or Firm*—Browdy and Neimark

[57] ABSTRACT

An improved valve body concerning the bathtub cold/hot water valve system, comprising a housing fashioned to be one-piece, a sealing ring set for the connection between the valve body water inlet and housing of the water valve system that has plane-to-plane contact therebetween, and an angle controller which is provided inside the valve body housing and is a part thereof to control the turning of angle with respect to the valve body's operation bar. This improved valve body has a prolonged use life and can reduce expenses of frequent maintenance.

8 Claims, 5 Drawing Sheets

B-B SECTION

B-B SECTION

VALVE BODY CONCERNING THE BATHTUB COLD/HOT WATER VALVE

FIELD OF THE INVENTION

The present invention relates to an improved valve body concerning the bathtub cold/hot water valve, and particularly to an improved one which has a prolonged use life and can help reduce expenses on maintenance.

BACKGROUND OF THE INVENTION

A conventionally used valve body, as shown in FIGS. 1, 2, of the bathtub cold-hot water valve system, comprises housing A, ceramic valve B, operation bar C, angle controller D. Housing A is shaped by main barrel E to which water inlet barrel F is screwed through threads, and contains ceramic valve B and part of operation bar C, the operation bar's angle controller D being a spring pin to meet a pinhole in operation bar C and extend into the holding cross groove G of main barrel E, in order to control the turning angle of operation bar C and have its front and rear sides positioned.

In assembling to housing H of the bathtub cold-hot water valve system, housing A with male threads, by means of packing ring J, could be just screwed together with housing H with female threads, making the water inlet barrel F, which has sealing ring K set around its front, inserted the water source pipe. Therefore, after sealing ring K united to the water source pipe wall, water supply shall come from inlet L of water inlet barrel F to the front of ceramic valve B to be ready for use. At time of use, turning operation bar C may bring ceramic valve B to work, so the water from inlet L is expected to go through ceramic valve B to outlet M, available on both lateral sides of main barrel E, to flow out by way of the drainage pipe N of housing H.

Since the above-said conventional valve body had its patent, factory production began and a number of this kind of valve body has been shipped to many countries for sale for years and received good reputation. However, after years' use, a few of them were found to have water leak and destruction problems. And after research, analysis, and inspection on some defective samples, there are findings regarding the cause:

1. The surface of sealing ring K, set around water inlet barrel F outside, occurs with scrapes and resilience fatigue, which scrapes are probably caused by turning water inlet barrel F for assembly, to cause water in the water source pipe to permeate and leak in drops out of drainage pipe N.
2. The threads adaption between main barrel E and water inlet barrel F is imperfect, as a result, let the water has space to permeate and drop out of drainage pipe N.
3. Sealing ring O, set behind water outlet M, occurs with scrapes, so the water passing outlet M may permeate into angle controller D to rust and corrode the spring pin and make it broken down eventually.

OBJECT OF THE INVENTION

This invention is aimed to solve the above described shortcomings by providing an improved valve body, whose structure has features:

1. The sealing ring, set for the valve body housing front, is positioned right at the front end, to offer a plan-to-plane contact for connection assembly to eliminate water leak possibility.
2. The valve body housing is fashioned one-piece, to prevent any imperfectness about the threads adaption between two pieces that would lead to water leak.
3. The operation bar's angle controller is provided inside the valve body housing and is part thereof, to save use of sealing ring and eliminate corrosive destruction when water leak should happen.

SUMMARY OF THE INVENTION

This improved valve body concerning the bathtub cold/hot water valve system has improvements of three aspects. Firstly, the valve body housing is fashioned in one-piece, to prevent any imperfectness about the threads adaption between two pieces screwed that would lead to water leak. Secondly, the valve body's water inlet, connecting to the housing of the water valve system for assembly, has a plane-to plane contact therebetween by means of a sealing ring to ensure close meeting without water leak possibility. Thirdly, the operation bar's angle controller is positioned inside the valve body housing and is a part thereof, this manner not only can save the sealing ring but it can also eliminate the worry about its corrosive destruction caused by water leak.

SPECIFICATION DESCRIPTION

Figure 1:
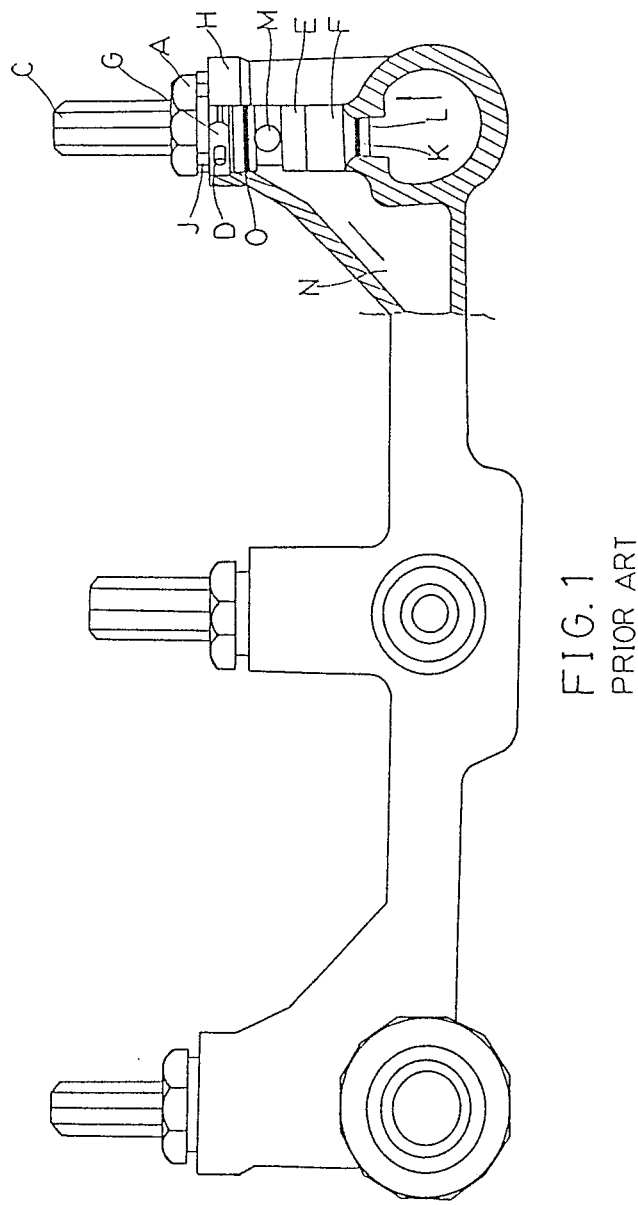
FIG. 1 is an appearance perspective view of a conventionally used valve body concerning the bathtub cold/hot water valve system.
Figure 2:
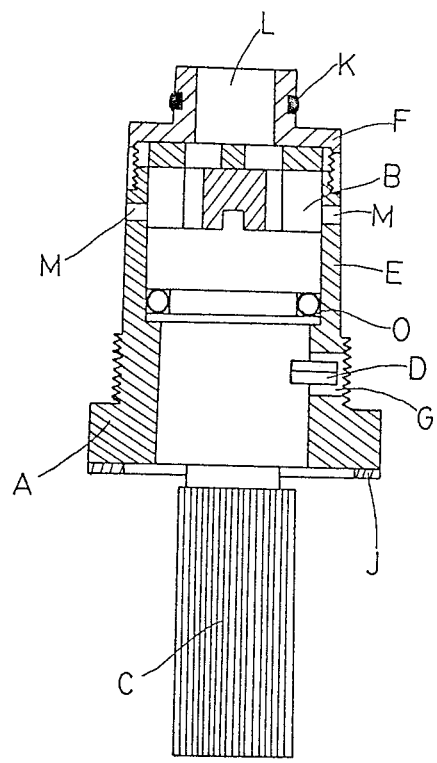
FIG. 2 is a cross sectional view about FIG. 1.
Figure 3:
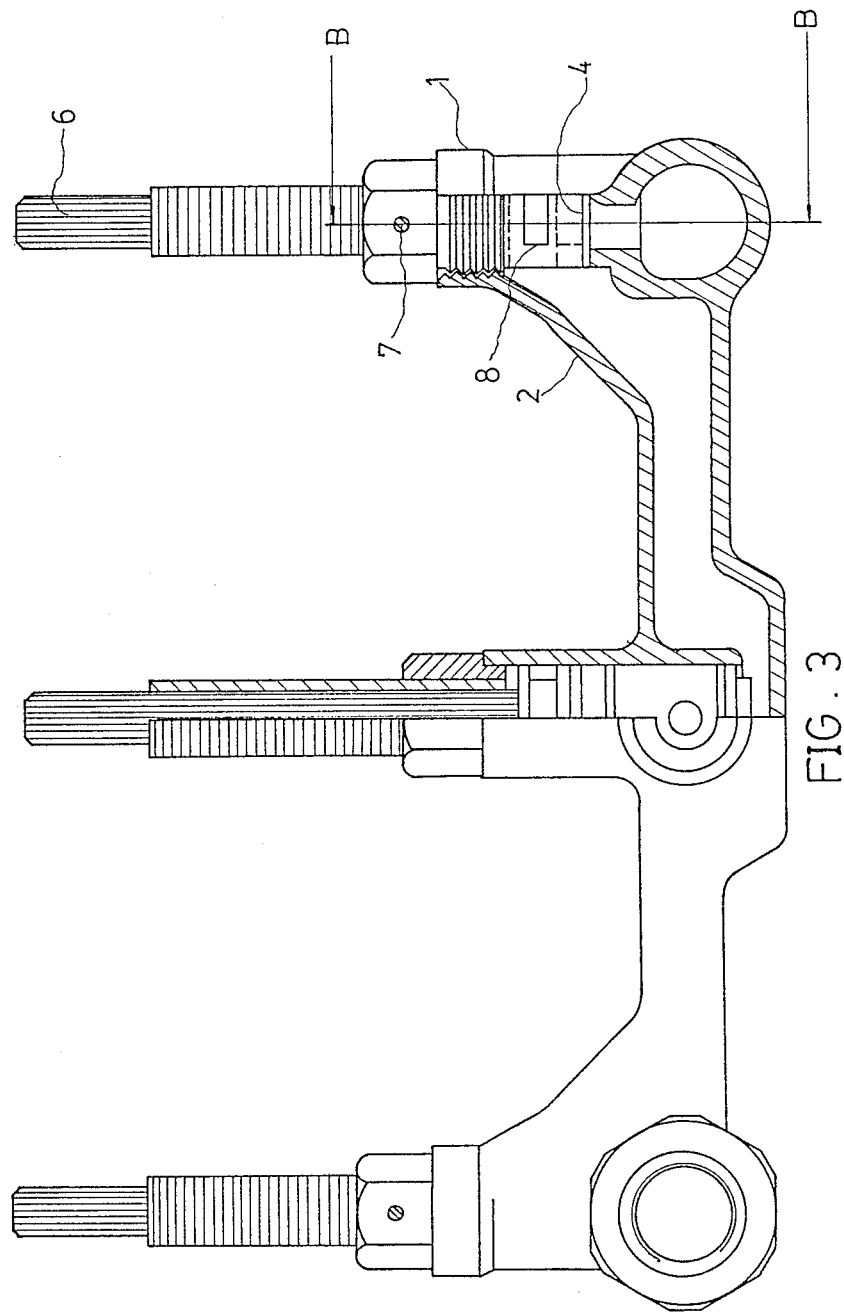
FIG. 3 is an appearance perspective view of the inventive valve body.
Figure 4:
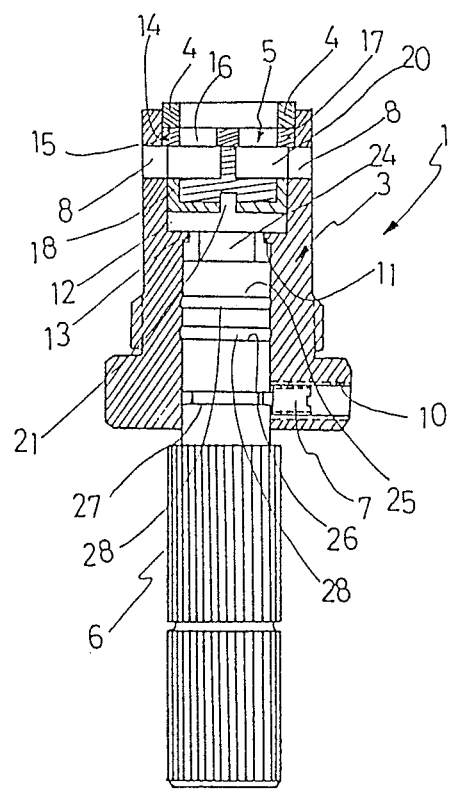
FIG.4 is a sectional view taken along B—B line in FIG. 3.
Figure 5:
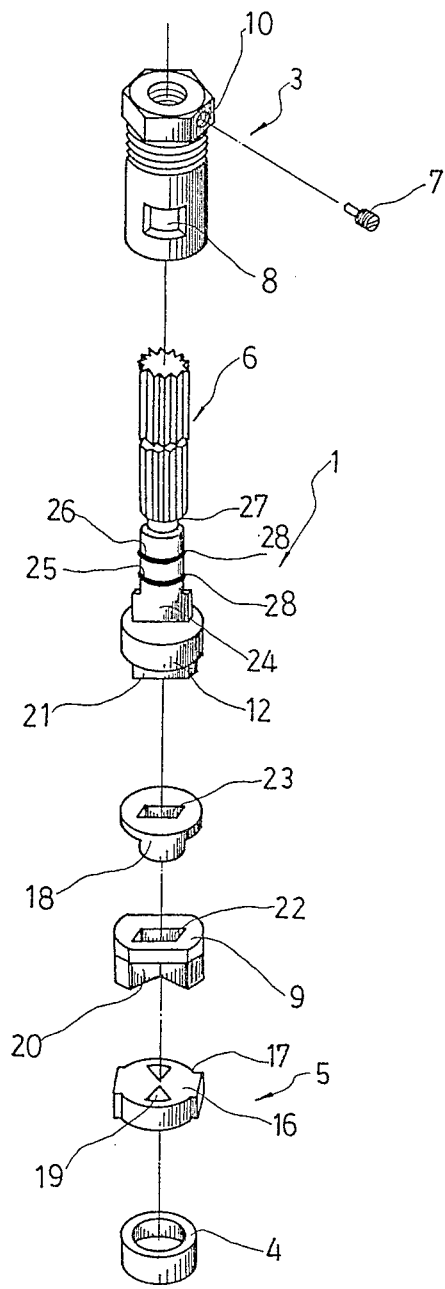
FIG. 5 is an exploded view about FIG. 3.

Firstly referring to FIG. 3, this inventive valve body 1 is connected to the two lateral sides of cold and hot inlet pipes of bathtub cold/hot water valve system 2, the center of which is a valve body that controls the water to be drained downward to enter the bathtub or, alternatively, upward to the shower head for showering (not shown in the Figures here). Since the center of bathtub cold/hot water valve 2 is in structure generally same as the conventionally used and not a target this invention aims at, further description about it is omitted. Now, in regard to structural improvements of valve body 1 of this invention, description begins as follows:

Referring FIGS. 4, 5, valve body 1 comprises housing 3, sealing ring 4, ceramic valve 5, operation bar 6, and set screw 7. Housing 3 is a hollow cylinder in a length, of which the front part is provided with cross, rectangular outlets 8, positioned against each other and just directed to adapt to the V-shape outlet 20 of turning body 9 of ceramic valve 5, whihc is connected to the inward to housing 3, to let the hot or cold water from V-shape outlet 20 smoothly stream into the drainage pipe of cold/hot water valve system 2 to drain away. The mid outer face of housing 3 is provided with male threads for being screwed with the connection base of housing of water valve 2 together securely, and thre rear of housing 3 is shaped with a hexangular head, where on one side there is screw hole 10 met with set screw 7 to control operation bar 6 to turn positionedly without any displacement forward or rearward. In the mid suitable position of the inside of housing 3, there is provided annular flange 11, that comes to shoulder the extended piece 12 at front of operation bar 6, and which is provided with two positioning convex points 13, positioned oppositely, in adaption to the flat bar 24 of operation bar 6, to control the turning angle range with respect to the operation bar so as to control the close and open of ceramic valve 5. The front inside of housing 3 is provided with annular shoulder 14 for being set with sealing ring 4, which has appropriate resilience and a suitable part of it shall extend out of the housing front after set thereto, to make close contact with the end face of the connection base of housing of water valve 2 and connect to the water supply pipe thereof. On the wall below annular shoulder 14, there are provided a pair of holding longitudinal flutes 15, positioned against each other, to meet united with a pair of opposing lugs 17 on the perimeter of fixed body 16 of ceramic valve 5, to make fixed body 16 fixed in position. Ceramic valve 5 comprises fixed body 16, turning body 9, and pad body 18. Fixed body 16, secured by means of lug 17 onto holding flute 15 of housing 3, is provided with two symmetrically opposing fan-shaped inlets 19, and contacted with turning body 9 which has a V-shape outlet 20 provided for adaption and flute 22 behind used to make coupled with actuating piece 21 of the end of operation bar 6, and, furthermore, topped with pad body 18 which too has a flute 23 to make coupled with the actuating piece 21. Therefore, turning operation bar 6 to bring turning body 9 to turn shall make its V-shape outlet 20 and fixed body's fan-shaped inlet 19 face direct, or partially, or separated away from each other, this manner that the water flow could be regulated and controlled. In the front part of operation bar 6, there are provided extended round piece 12, actuating piece 21 at front end, and flat bar 24 behind, to control the turning angle scope of the operation bar via the action generated by positioning convex points 13 on annular flange 11 inside of housing 3. On the round bar body behind flat bar 24, there are provided three cross, annular flutes 25, 26, 27; the front two flutes 25, 26 are each set with sealing rings 28, while the last flute 27, adapted to screw hole 10 of housing 3, receive the front part of set screw 7 when screwed to stabilize operation bar 6 without forward and backward movement. Set screw 7 is a flush-headed screw and has a length of its front part not provided with any threads for insertion into annular flute 27. The rear part of operation bar 6 in structure is generally same as the conventionally used, so more description is omitted.

I claim:

1. An improved valve body concerning the bathtub cold/hot water valve, which comprises a housing, a connection sealing ring, a ceramic valve, an operation bar, and a set screw, is improved structurally on the housing, which is a hollow cylinder in a length and is provided with two cross, positioned oppositely, rectangular outlets in the front part, adapted to the V-shape outlet of the turning body of ceramic valve inside the housing; the rear of the housing provided with a hexangular head, where on one side there is provided a screw hole for a flush-headed set screw to insert thereto and extend into an annular flute of operation bar to control it to during turning without moving forward and backward; at a mid suitable position of the inner wall of the housing, there being provided an annular flange, which comes to shoulder an extended piece of the front of operation bar, and is provided with positioning convex points, positioned oppositely, in adaption for the flat bar of a length of operation bar, to control the operation bar's turning angle scope and ceramic valve's open and close states; at the housing inside front end, an annular shoulder provided to be set with a sealing ring, which extends a suitable length from there when set, for the close connection with the end face of the connection base of housing of the cold/hot water valve system to connect with water supply pipe.

2. An improved valve body according to claim 1, wherein said sealing ring is in form of a flat circular ring and has appropriate resilience.

3. An improved valve body according to claim 1, wherein ceramic valve's fixed body is provided with two fan-shaped inlets, symmetrically positioned, while its turning body's front is provided with an adapted V-shaped outlet.

4. An improved valve body according to claim 1, wherein the operation bar's front is provided with an extended round piece, an actuating piece at the front end, and a lengtrh of a flat bar behind, and there are provided three cross annular flutes on the round bar body behind the flat bar, the front two annular flutes each being set with a sealing ring, while the last annular flute being to receive the front end part of the set screw to stabilize the operation bar without moving frontward and backward.

5. An improved valve body according to claim 1, wherein the front end part of said set screw has a length not provided with any threads.

6. An improved body according to claim 1 wherein said turning body comprises a plate fixed to the stem side of said turning body, and said V-shape outlet lies below said plate.

7. An improved body according to claim 6 wherein said plate has a flute in its center for receiving an actuating piece.

8. An improved body according to claim 6 wherein said plate is generally circular having at least one flat which engages a "D" shaped extension of a pad body.

* * * * *